US007159178B2

(12) United States Patent
Vogt et al.

(10) Patent No.: US 7,159,178 B2
(45) Date of Patent: Jan. 2, 2007

(54) SYSTEM FOR SUPPORTING A VIRTUAL COMMUNITY

(75) Inventors: Eric E. Vogt, Belmont, MA (US); Julie Wittes Schlack, Cambridge, MA (US); Linda Koretsky, Acton, MA (US); Paul Morrison, Dover, MA (US); David Savage, Holliston, MA (US); Lauren Kelleher, Watertown, MA (US)

(73) Assignee: Communispace Corp., Watertown, MA (US)

( * ) Notice: Subject to any disclaimer, the term of this patent is extended or adjusted under 35 U.S.C. 154(b) by 269 days.

(21) Appl. No.: 10/078,915

(22) Filed: Feb. 20, 2002

(65) Prior Publication Data

US 2003/0028595 A1 Feb. 6, 2003

Related U.S. Application Data

(60) Provisional application No. 60/270,832, filed on Feb. 23, 2001, provisional application No. 60/270,272, filed on Feb. 20, 2001.

(51) Int. Cl.
*G06F 3/00* (2006.01)
*G06F 3/14* (2006.01)

(52) U.S. Cl. ............... 715/733; 715/744; 715/751; 715/753; 715/835; 715/501.1; 709/203; 709/204

(58) Field of Classification Search ......... 345/751, 345/753, 716, 733, 738, 744, 764, 848, 757–759; 709/201, 213, 203–205; 715/501.1, 716, 715/733, 738, 744, 764, 835, 838, 848, 751, 715/753, 758, 764; 463/42
See application file for complete search history.

(56) References Cited

U.S. PATENT DOCUMENTS

| | | | | |
|---|---|---|---|---|
| 5,537,618 A * | 7/1996 | Boulton et al. | ............ | 715/745 |
| 5,799,191 A * | 8/1998 | Moriyasu et al. | ........... | 709/204 |
| 5,854,893 A * | 12/1998 | Ludwig et al. | ............ | 709/204 |
| 5,974,446 A * | 10/1999 | Sonnenreich et al. | ....... | 709/204 |
| 5,983,214 A * | 11/1999 | Lang et al. | ................... | 707/1 |
| 5,995,951 A * | 11/1999 | Ferguson | .................... | 706/10 |
| 6,161,149 A | 12/2000 | Achacoso et al. | ............ | 710/4 |
| 6,256,032 B1 * | 7/2001 | Hugh | ........................ | 715/854 |
| 6,347,333 B1 * | 2/2002 | Eisendrath et al. | ......... | 709/217 |
| 6,463,461 B1 * | 10/2002 | Hanson et al. | ............. | 709/204 |
| 6,611,822 B1 * | 8/2003 | Beams et al. | | |
| 6,692,359 B1 * | 2/2004 | Williams et al. | .............. | 463/42 |
| 6,769,010 B1 * | 7/2004 | Knapp et al. | ............... | 709/203 |
| 2002/0023132 A1 * | 2/2002 | Tornabene et al. | .......... | 709/205 |
| 2002/0076674 A1 * | 6/2002 | Kaplan | ....................... | 434/107 |
| 2002/0103695 A1 * | 8/2002 | Urken at al. | .................. | 705/12 |
| 2003/0018719 A1 * | 1/2003 | Ruths et al. | ................ | 709/205 |
| 2003/0105817 A1 * | 6/2003 | Lapstun et al. | ............. | 709/204 |

(Continued)

OTHER PUBLICATIONS

"LOTUS DEVELOPMENT: Environment for creating and managing private online communities debuts in Europe", 1995, M2 Presswire.*
Martin J. Garvey, "Lucent teaches technology via videoconferencing", 1997, Informationweek.*

(Continued)

*Primary Examiner*—Lucila X. Bautista
(74) *Attorney, Agent, or Firm*—Choate, Hall & Stewart LLP (57) ABSTRACT

A browser-enabled system of software and services that focuses on connecting people across spatial, temporal, and organizational barriers to achieve specific objectives. The system includes a client server system that provides a virtual meeting place for a learning community and a structure through which that community can achieve its goals.

37 Claims, 4 Drawing Sheets

U.S. PATENT DOCUMENTS

2003/0227479 A1* 12/2003 Mizrahi et al. ............. 345/753
2004/0153508 A1* 8/2004 Alcorn et al. ............... 709/205

OTHER PUBLICATIONS

Sophie Boukhari, "Cybersnoopers on the prowl", 1998, UNESCO Courier.*

"Blackboard.com Goes Back To School with More Than 9,600 Instructors, in Every State and in 60 Countries", 1999, Business Wire, p. 1364.*

"Blackboard Products", DATAMATION, Earthweb, May 3, 2000.*

Ken-ichi Okada et al, "MAJIC and DesktopMAJIC conferencing system", 1996, ACM Press.*

Christina Fisher, "Nexpo '96, II: editorial and advertising systems and electronic publishing", 1996, Seybold Report on Publishing Systems, v25, n21, p. 3(51).*

D. Miller, "Trim travel budgets with distance learning", Sep. 1991, Journal: Training & Development, vol. 45, No. 9, p. 71-4.*

* cited by examiner

FIG. 1

Hotsnowballs communiSpace
Hotsnowballs empowered by
communispace
COMMUNITIES THAT WORK PLACES: *My Communities*  All Communities  Terms

DIALOGUE

PEOPLE
- home
- members
- instant messages
- chat

ACTIVITIES
- brainstorm
- dialogue
- voting & polling
- insights & actions
- journal

RESOURCES
- search
- references
- gallery
- bookstore
- schedule
- help
- climate Learning from the Hotsnowballs Conversion   Brian Harrold 11/21/00 6:37:12 PM Reaction to the new message icons   David Savage 11/22/00 11:11:12 AM Colors and words   Mitchell Nash 11/22/00 2:21:51 PM Too much of a good thing | Maria Rapp 11/26/00 12:48:20 PM Maria Rapp
Posted: 11/26/00
Too much of a good thing

I agree with Mitchell. Now that we have several postings to this dialogue there is a lot of red. I don't object to the color per se, I'd like to see some variation - maybe the icons should be one color, the headers another, etc.

● reply to this message    ● contribute to this dialogue    ● return to dialogue menu

Hotsnowballs communiSpace  *empowered by* communispace COMMUNITIES THAT WORK

PLACES: | My Communities | All Communities | Terms

PEOPLE
- home
- members
- instant messages
- chat

ACTIVITIES
- brainstorm
- dialogue
- voting & polling
- insights & actions
- journal

RESOURCES
- search
- references
- gallery
- bookstore
- schedule
- help
- climate

1 Generate Ideas | 2 | 3 | 4

Current Phase    Read Only    Read Only    Read Only

Question/Purpose: What "stamps" (such as 'time saver,' 'money saver,' and 'Innovation') would be useful to apply to Communispace contributions?

Generate Ideas
Submit your ideas.

[ submit ]

Discussion

Julie: Thanks Eric. This is tremendously useful especially because there's lots of "negative" terms (e.g. Concern, Red Alert, Budget Buster) that are absolutely as valuable to capture as the positive ones.

Eric: Great Brainstorm, Julie!

*Ideas List*
- don't miss this
- pass this on
- Great Insight
- Best practice
- Observation
- Collaboration Opportunity
- Example please?
- Please clarify?

Submit your comments

[ submit ]

SYSTEM FOR SUPPORTING A VIRTUAL COMMUNITY

This application claims priority of Provisional Patent Application No. 60/270,272, filed Feb. 20, 2001, and Provisional Patent Application No. 60/270,832, filed Feb. 23, 2001, the entire contents of both of which are incorporated by reference herein.

FIELD OF THE INVENTION

This invention pertains to the design, creation, management, and facilitation of virtual communities.

BACKGROUND OF THE INVENTION

As competition becomes driven by knowledge, work and speed, the pressures on corporations are changing and growing. Success in the new, knowledge-based economy requires innovation, knowledge creation and application, fast cycle time, customer intimacy, talent retention, and adaptability. In response to the critical need of organizations to gain these strengths, companies are turning to online virtual communities for external (Customer Community) and internal (Corporate Community) purposes. Customer Communities combine quantitative and qualitative feedback needed to develop and leverage customer insights, market trends, and to forge stronger customer relationships. These communities combine and extend the concepts of focus groups and Customer Relationship Management (CRM) and provide a more effective method for capturing these insights and developing customer intimacy. Further, organizations must connect with suppliers and partners for similar purposes. Organizations are exploring online virtual communities as a way to bring market intelligence back into the organization in an "always on" manner.

Corporate Communities combine the strength of communities of practice and knowledge management. A community of practice is composed of professionals in the same discipline who come together to share an informal learning, ad hoc problem-solving, professional networking, and mutual support. Knowledge management is the process of identifying, selecting, and organizing the intellectual capital of a company and presenting that knowledge in a manner that helps all the company's employees comprehend and use that information. The union of these characteristics suggests ways in which employees in one section of a company can communicate what they have learned, for example, during a recent project, to other employees in a different section of the company. A professional learning group provides a powerful, organized setting through which companies can ensure not only the circulation of knowledge but the use of past experience to generate new, creative ideas.

As companies become more global, opening branch offices around the world, it is no longer sufficient for a small group of engineers to share ideas as they gather around the water cooler or the lunch table. It is not enough to share knowledge within a small section of an organization; that information must be communicated to employees throughout the global organization. However, knowledge does not passively diffuse through an organization. Instead, companies are increasingly seeking ways for employees at different company locations to actively share and generate ideas.

SUMMARY OF THE INVENTION

In one aspect, the invention is a system for bringing together a community having a plurality of members comprising a client server system. The client server system comprises data input means for receiving member contributions, data storage means for storing member contributions, and output means for displaying member contributions to the community. The client server system provides a virtual location for members to develop a virtual online community. The members are invited to participate in the community, and the community is brought together to achieve a predetermined goal.

In another aspect, the invention is a method of evaluating interpersonal relationships among members of a virtual community. The method includes providing a client server system comprising data input means for receiving member contributions, data storage means for storing member contributions, and output means for displaying member contributions to the community. The method further includes configuring the data input means to provide each member contribution at least one category assignment and configuring the data output means to provide ratios of a number of member contributions in at least a first category to any of a number of members of the virtual community, a number of member contributions, and a number of member contributions in at least a second category.

In another aspect, the invention is a method for incorporating institutional memory into an online activity. The method comprises providing a client server to receive input from activity participants and provide individualized output to each participant, receiving contributions from the activity participants, comparing a first characteristic of each contribution to contributions in an archived activity, and establishing a first cross-activity thread comprising contributions having a shared first characteristic.

BRIEF DESCRIPTION OF THE DRAWING

The invention is described with reference to the several figures of the drawing, in which.

DETAILED DESCRIPTION

The present invention provides a browser-enabled system of software and services that focuses on connecting people across spatial, temporal, and organizational barriers to achieve specific objectives. The system connects individuals to colleagues who can help them make decisions, solve problems, and learn quickly by helping them form a community with specific performance goals. The invention provides a virtual space, tools, activities, and business processes that enable users to meet, dialogue, share documents and links, develop best practices, provide mutual aid, and develop a sense of group identity. The invention enables the type of collaboration, acculturation, and sharing of tacit knowledge that occurs naturally when colleagues share the same time and physical space. However, it does so for knowledge workers who are separated by time zones and geography.

The system may be housed at an access server provider, or ASP, or locally, at the client company's own servers. The setting and tools presented to each community can be customized. Before a community website is launched, the ASP and the client company may meet to set goals, define the membership of the community, and determine whether more than one community is needed to support the client's goal. The client may also customize the community website in a variety of ways. In one embodiment, the appearance of the web pages on the community site may be customized, for example, by altering the colors and graphics used in various displays, modifying font characteristics, customizing navigation panels and tool bars that guide users through the community website, incorporating text or logos specific to the client or community, or changing domain specific terminology such as activity names. In addition, the content of the site may be customized, for example, by including a reading list, suggested links and useful documents, or community goals. The participation of the community members may be recorded and displayed in the website, for example, through detailed activity and participation reports and in Climate (community health) measures, and/or reported to the client or the ASP.

Communities are the primary work environments for users. A user may belong to one or more communities. A community has a list of members, a purpose, a set of tools, activities, and projects. The community works to achieve common goals, and generally exists for a longer (or indefinite) period of time. A community typically has less than 200 users.

Communities are a subset of an enterprise environment. Participants might use the enterprise environment to share documents between communities and to do enterprise-wide polls and surveys. Enterprise membership is the union of the membership of all communities within the enterprise. Enterprise-wide tools, activities, and projects are likely a subset of those for any given community. The main purpose of the enterprise community is 1) a forum for exposing content developed within a community to the enterprise at large, and 2) as a forum for interacting around topics of interest to the entire enterprise.

Special interest/focus groups and/or project teams may be formed across community boundaries to work on more focused activities. Special interest/focus groups and project teams have explicit goals, milestones, and deliverables, and a defined, structured set of activities for achieving those goals. Teams are typically used by a small number of people from one or more communities and are generally of a finite duration. Team members are a subset of the enterprise environment (i.e., they may cross community boundaries) and typically have less than 20 users, although there is no fixed limit. The activities performed by team members may be similar to those performed within communities, or the teams may perform specific tasks that are not typically performed by communities. For example, a community of engineers may form to share best practices. A sub-set of this community may then be formed to explore the impact of a specific technology or process. The sub group would then report back to the community-at-large. In another example, a "customer community," that is, a community comprising the customers of an organization, may be formed to share ideas and insights and best practices among themselves. The organization may then ask a subset of this community to participate in a more focused discussion (or focus group) where a team may form for that purpose.

A project team convenes to accomplish a project, a specific set of activities to accomplish a specific, short-term task or deliverable. To create a project, its convener is guided through a series of prompts, to invite users from anywhere in the enterprise to join the project team, define the project's objective as well as any incremental milestones and deliverables along the way, and select and schedule a set of activities to support the interim milestones and terminal objective. These activities may be in a simple, linear sequence (e.g., first a brainstorm, then a dialogue, then a vote); alternatively, there may be a few parallel or overlapping activities associated with each milestone. In one embodiment, the convener of the project (the project team leader) is the default convener of each activity included in that project, but the project team leader can edit each activity's start date, end date, and convener, either sharing or assigning the convener role to someone else on the team. At any time during a project or when it is complete, the team leader and members may elect to publish any of its content to the "parent" communities and/or the enterprise. When the project is complete (as indicated by the project team leader), the team is disbanded and its content is archived. Thereafter, team members could access the team's activities and content in read-only mode by browsing the "Archived Teams" section of their "My Communities" page (see below).

Enterprise administrators, community facilitators, and project team leaders use the administrative environment to create or modify enterprises, communities, and teams. The enterprise administrator, an employee of the ASP, has a superset of all privileges, and can set up and configure each new enterprise and its constituent communities. The community facilitator has a subset of privileges, and can modify community purpose and membership. The community facilitator may modify community parameters and options. For example, the facilitator's environment may be an extension of the community environment, and the facilitator may have an extra tab on his/her navigation bar (see below) allowing monitoring and editing of specific community activities. While anyone may create a team, the team's leader may then modify the team's membership and other team parameters and options. The following example illustrates the relationship between the community, enterprise, and team environments:

The invention is in use at a global consumer packaged goods company. The company maintains three online communities (representing three demographic customer sets). Typical activities inside each community might include dialogue, surveys, and gallery exhibits specific to the community and created either by the company or the individual members. The company can also create activities that span the three communities (e.g., a poll that all members of all communities engage in) with aggregated results. The company can also create an activity that appears in all three communities, but where the activity content or results are specific to (and separated by or visible to) each community.

The company can further create a team or focus group comprised of members from across the communities. This group can then engage in activities that are only visible to the group. For example, a select number of members may be invited to a engage in an initial product concept test designed to gather feedback and iterate the product before presenting the concept to the general population.

Activities are discrete processes or sets of interactions that allow users to collaborate, often within a guiding structure, to achieve a specific goal. Activities might be a single, stand-alone step (sometimes called a "tool"), or set of steps. A dialogue or poll is a simple activity; a multi-phased brainstorm session is a more complex activity (see below). There may also be overlap between a tool and an activity. For example, a dialogue (an exemplary activity) may use a threaded discussion tool. Both the activity and the tool accomplish the same goal, but they are described differently. Certain enabling technology components for the tools and activities, such as a search engine, may be licensed and used in the community site. Some activities combine multiple tools. For example, a brainstorm activity combines chat, dialogue, categorization, and polling. The activity further "surrounds" these tools with a process and control function to move the activity from one phase to the next.

Participants may execute a variety of actions for an activity. The convener initiates the activity and may also delete it if no one else has participated in it. When convening an activity, the convener should specify whether the activity is open to all users or by invitation only, whether the activity is synchronous or asynchronous, whether any users should be notified by email of the new activity, access rights for content in the activity, and how many ranked items to display on the activity's web page. In addition, the convener should also give the activity a name, keywords, a description, and start and end dates. The convener may also publish content in another community or team environment (with either read only or read/write privileges) or archive content before the activity's end date. The participants may print content, download it into a word processing or spreadsheet program, or participate in the activity.

Processes are pre-defined sequences of activities. Processes may be convened in their entirety or on an activity-by activity basis and may be conducted synchronously or asynchronously. For example, a product concept test may combine an interactive series of stimulus (gallery, reference, dialogue) and response (dialogue, survey, chat). The environment may be supplied with a preassembled process that may be customized by the enterprise administrator, or a new process may be assembled according to a client's specific needs. Processes tend to be specific to different types of communities. For example, a learning community would include a seminar process, whereas a community of practice for sales and marketing personnel would include a competitive analysis process. Specific processes may be enabled for certain clients based on their needs.

One of the advantages of an organized knowledge community is that members can access the content created by the enterprise members, allowing later users to benefit from the institutional history of the enterprise. The system may have tools that enable the users to create a list of contributions as new content is created. The items on the list may be formatted or numbered, and the users may classify or group the items on the list and download them for future reference outside the community environment.

Content (both created during activities and submitted by users) may be searchable and may also be organized for viewing, browsing, or searching. For example, content may be organized according to the user who owns or created it. Preferably, content is organized into categories and sub-categories. For example, categories might be "Trains," "Aircraft," and "Automobiles." Sub-categories within Automobiles might be "Compact," "Intermediate," "Sedan," "Luxury," etc., with sub-categories below each of those for "Standard" and "Automatic." A user could choose to view content according to topics and then browse through the content hierarchy to find information.

Keywords may also be associated with categories at the enterprise and community level. Keywords index content on a more specific, granular level than do categories. In the example above, "Automobiles" is a category in which "Japanese Cars" and "American Cars" might be keywords. Thus any new content submitted to the Automobiles category could then be more precisely indexed by having keywords from that category associated with it.

The use of keywords may be enabled or disabled on an enterprise level, and if enabled, can be made optional or mandatory. For example, if categories are enabled and required and keywords are enabled but optional, a participant who convenes a new activity would be required to assign this activity to at least one category. After selecting a category (and potentially, a subcategory), the participant would then be presented with a predefined list of keywords from which to choose, and be given the option to also assign keywords to this activity. In one embodiment, keywords are only defined by enterprise administrators, community facilitators, and project team leaders for their respective domains, but keywords may be assigned and searched on by any participant.

All content that is posted by users is archived, and the content, along with activities and projects, are preferably searchable by category, subcategory, and/or keyword. In an alternative embodiment, content is also searchable by other properties, such as creation date, activity type (e.g., brainstorm, dialogue), contributor, viewer (users who have accessed the material), rating (e.g., members assign a value to content based on a scale such as 1–10), archiving date, popularity (how many times content was accessed), or exposure (how many users have accessed the material). Full text searching may also be provided by the system. The search integrates content from the various activities and projects, user profiles, and other resources on the system. External data sources, such as the client's own knowledge management system, may be searchable as well. User profile searching enables users to find experts, and the user profile may include the user's area of expertise, publications, and/or interests to facilitate effective searching. Content contributed by members to various activities may be linked to the member profile to help other members associate a face or personality with the member's contributions.

In one embodiment, before the community site is launched, the community members are notified and asked to provide contact and personal information that will enable the members of the community to get acquainted with one another. Once the community members have submitted the requested information, they are provided login information for the community site and a technical specification detailing the software and hardware required to properly access and use the community site. In addition, each member may receive a welcome message from a facilitator for the community and a suggested get-acquainted activities. Thus, the community is not formed spontaneously by a group of people who happen to find that they live in the same neighborhood or attend the same movies. Instead, the community is a group of people who are intentionally brought together by the client to achieve a specific goal. The initial orientation activities for the community serve the same purpose as they would at an organization's retreat. The combination of the screening and recruitment process, the member profiles, the get acquainted activities, and the facilitator interventions are instrumental in building trust and establishing relationships among community members. This in turn accelerates participation, insights, knowledge creation, and sharing.

After the participants have been introduced to one another, the community site facilitates a variety of both individual and community-wide activities that enable them to achieve a specific goal. Of course, the individual participants can also edit their profiles or update their values and perceptions, providing a way for the community to evaluate its evolution as a group and provides one of several methods for the facilitator to measure the community's "health".

Figure 1:
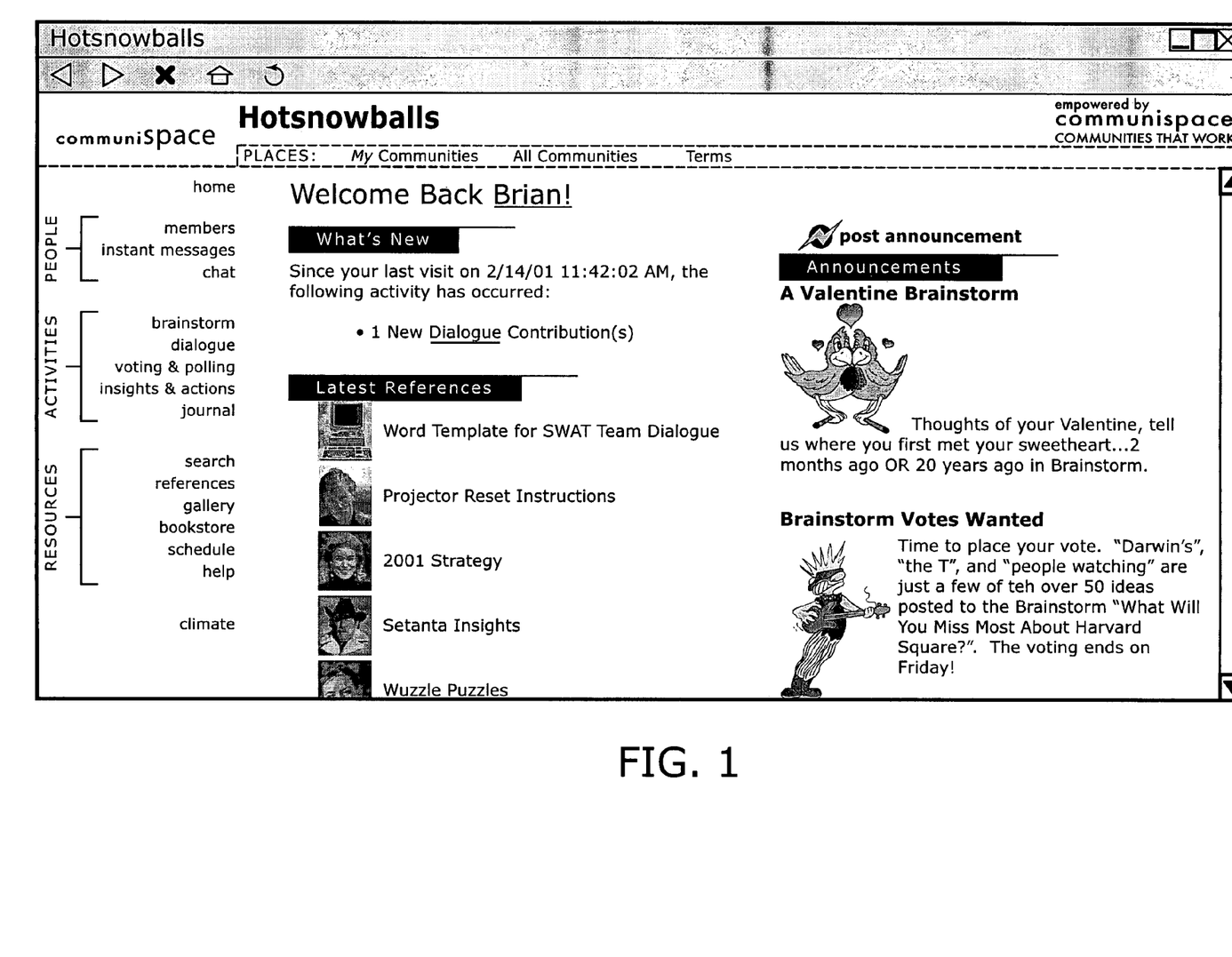
FIG. 1 is a homepage for a virtual community.

In one embodiment of the system, when users log in to the enterprise site, they are guided to a personalized homepage listing announcements, a personalized "What's New" section and navigation and tool bars enabling them to visit other areas of the community, such as the communities that the user is a participant in ("My Communities", "Teams") and other communities in the enterprise (FIG. 1). The "What's New" section includes links to all content that has been updated or added since the last time a particular user logged in. The member may also view a list of members of his/her communities who are logged in. The list may include members' pictures and/or links to their profiles. As the user moves through the site, icons will appear next to all unviewed material, including dialogues, dialogue contributions (discussed below), member profiles, and other contributions. The user may customize his/her interaction with the site. For example, the user may request that the ASP or server system send a notification when another user changes specified content, or the system may email the user the new content. If the system provides email, the user may indicate whether email should be formatted in plain text or HTML. In addition, the user may create email groups (a team, a community, a subset of these) to which he/she sends email frequently. The user may modify personal data such as name, email, location, etc., their community-specific member information. This information, which describes the member to the community, is presented in a series of questions. The specific questions can be customized by the facilitator to generate the type of profile that supports the community's objectives.

In a retreat environment where community members meet face-to-face, it is relatively easy for individuals to determine the quality of their interaction and how they are perceived by others through both verbal and non-verbal cues. In an online environment, however, both facial expressions and tone of voice are absent. Thus, the community site preferably includes a climate function which provides information on several critical dimensions including trust, purpose, relationships, intensity, and discourse. After accessing a climate page, the individual members are able to complete surveys concerning their relationships with the other members of the community. Each member of the community can see how he or she is perceived by others. Other climate measures reported by users include purpose, an evaluation of how well the community is achieving its goals, trust, and relationship, a measure of who the user is working with and forming relationships with. The system provides questionnaires for use by a client that can be customized by the facilitator. The system also generates certain climate measures automatically. Intensity records the number of unique log-ins each week and the number of contributions (e.g., dialogues, dialogue contributions, submitted files, poll responses, updated member profiles, etc.). The intensity function may be set to track the number of substantive contributions, for example, by only counting responses having a threshold number of words. Discourse records the number of each type of contribution (e.g., question, answer, agreement, disagreement, request, commitment, decision, action item, etc.). This provides valuable information for a facilitator to track the changes in community "feeling" over time, and to take remedial action. The climate functions can provide raw data or ratios through which data can be compared. For example, the facilitator may want to know the ratio of substantive contributions or questions to total contributions or the number of members of the community. Alternatively, the facilitator may want to know whether a specific community member posts a lot of requests or disagreements. A relationship status graph shows conversational and relationship clusters within the community (i.e., who is talking the most to whom). A people page depicts user status, which users are currently on line, and what pages they are viewing. Measuring and monitoring the community's health and taking corrective action (as needed) is critical for a community to achieve its (or the sponsoring organization's) objectives. A climate system combines quantitative and qualitative (implicit and explicit) capture. it is embedded into the system and crosses all activities.

In any community, the various users assume different roles. For the community site provided by the ASP, some roles are predefined and preassigned. Nearly all users are participants at one time or another. Participants are the users that engage in the activities of the community, usually in response to a request from a convener or a facilitator. Any participant becomes a "convener" when he/she initiates a new activity. These new activities, in turn, initiate a "call to action" for participants to meet, discuss, vote, etc. That is, conveners initiate the structured or semi-structured activities that participants (including the convener) work on. Team leaders can be anybody in the community, but in practice they are usually the users that are responsible for producing a particular output (e.g., proposal, report, recommendation, etc.). Team leaders act as the creators and facilitators of their teams or focus groups. Indeed, a team leader's needs are mostly a cross between a convener and a facilitator. Facilitators are rare, with the majority of communities having only one or two, although more is possible. The primary goal of the facilitator is to ensure the overall health of the community and guide or manage the participants to achieve the community's objectives. In practical terms, this is often done by connecting participants to other participants, usually in the context of a semi-structured project initiated by a convener or facilitator. Facilitators also monitor the climate measures to spot trends, then use the detailed reports (activity, participation) and the detailed climate measures (discourse types) to identify and correct the root cause. enterprise and other support administrators are responsible for the operational integrity of the system.

The facilitator is assigned for the duration of the community. This person may be provided by the ASP or may be employed by the client's organization. In either case, the person is preferably highly skilled in online facilitation and knowledge community methodology. The facilitator convenes the initial goal setting activities, monitors the community's discussion and events and offers input and feedback, monitors the climate measurers and points out notable trends to the community for discussion, reaches out to new or uninvolved members, seeks volunteers or directly approaches candidates to fulfill specific community responsibilities, and keeps the community informed of events by maintaining the home page announcements. Over time, the community members may assume many of the administrative and cheerleading functions of the facilitator and assume more leadership for themselves. For example, the convener of a dialogue is encouraged to take an active role in posing questions to stimulate discussion, keeping the dialogue on track, and maintaining a respectful, collaborative environment. In addition, announcements on the home page may notify the community of who is fulfilling what role. The facilitator remains available to aid users with various problems and help them use the system.

The participants may also volunteer to assume certain roles. For example, a distiller provides a summary of a dialogue's conclusion and new information and adds an entry to a data base of shared learnings including a description of the event, what was learned, and what will be done differently next time. An artist creates exhibits for the community gallery. A pulse-taker periodically checks the climate measures, conducts surveys of the community members, and directs the community's attention to climate trends for discussion or simply to bring an issue to their attention. As noted above, pulse-taking is initially a task of the facilitator, but one which it is preferable to pass on to the membership of the community. A storyteller studies the themes, common threads, patterns, and personalities emerging in the community and synthesizes these into stories, parables, and myths that provide a mirror to educate the community about itself. A jester uses both invented and found humor to point out paradoxes, absurdities and blinders which prevent the community from making progress towards its goals. A greeter regularly checks member profiles, climate measures, and dialogues to identify and welcome new participants and engage uninvolved members. An evocateur seeks out unmet needs and unanswered questions in the community. He or she takes risks, challenges assumptions, and encourages the community to be more self aware. A protector upholds the mutually agreed-upon guidelines and norms of the community. As noted above, many of these roles, for example, greeter or protector, will be originally fulfilled by the facilitator and gradually assumed by the participants, allowing the community to develop direction from communal consensus. The invention provides a mechanism to enable and support these critical roles and/or activities in an online virtual community.

In addition to the initial get-acquainted activities and the climate function, participants may also learn about each other through real-time chats. An initial chat may be scheduled shortly after launch of the community site. During the initial get-acquainted activity, each participant may have only been introduced to one or two other members. During the chat, all of the participants are introduced to one another. The initial get-acquainted activities mimic the community building process of a retreat, where members initially circulate in a mixer, introducing themselves to several of the other members of the group. After the mixer, community members introduce the people they have just met to the rest of the group, allowing the participants to learn about one another. One advantage of performing these activities in a web-based system is that the initial mixer activity may be conducted by different participants at different times. Indeed, two participants who are introducing themselves to each other need not access the system at the same time; rather, they may accomplish the introductions through dialogue. A chat is then scheduled at a mutually convenient time.

One of the interactive chat activities hosted by the website is a café. The café section of the community site is a virtual space in which users may conduct ad hoc, unscheduled conversations. Alternatively, a conversation may be scheduled in advanced, or specific users may be invited to join. Each table in a café is somewhat analogous to a chat room. The users access the café through the navigation panel and are directed to a page including a text entry field where they can start a new conversation or select from existing conversations. The display of the existing conversations includes the topics and the participants for all chats currently underway. The community site may be customized to archive the chats by default or allow the chat convener to specify whether or not to archive it.

Activities such as brainstorm, meetings, and action planning may also incorporate either synchronous or asynchronous chats outside of the café setting. Once a user has joined a chat, a transcript of the chat is displayed on a separate page. The transcript includes a list and photos of the community members currently participating in the chat and abbreviated user profiles or links to the full user profiles. The transcript not only details the participants' contributions but when the participants entered and left the conversation. An individual participant can submit his or her contribution with text effects such as bold, italics, or color, and the site may be customized to allow other text effects such as font or font size. For example, each participant in a chat may set a color for his/her "text voice" in the chat. The participants may either view the last few events (contributions, entrances, or exits) in a conversation or a transcript of the entire chat to date. In one embodiment, both of these views are available simultaneously. For example, the complete transcript may be provided in a spawned window with a scrollable view.

Figure 2:
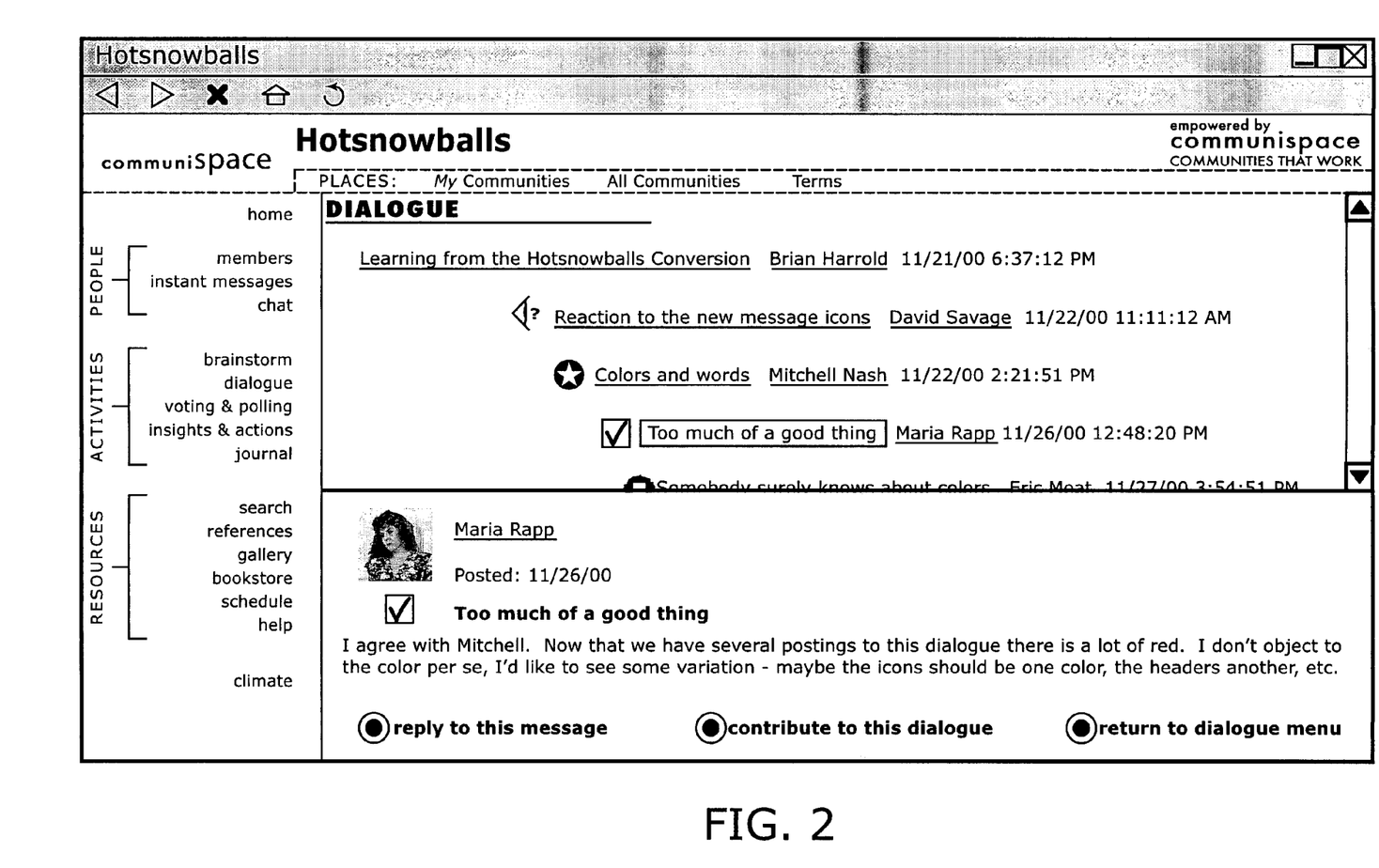
FIG. 2 is a web page for accessing a dialogue within the virtual community.
Figure 3:
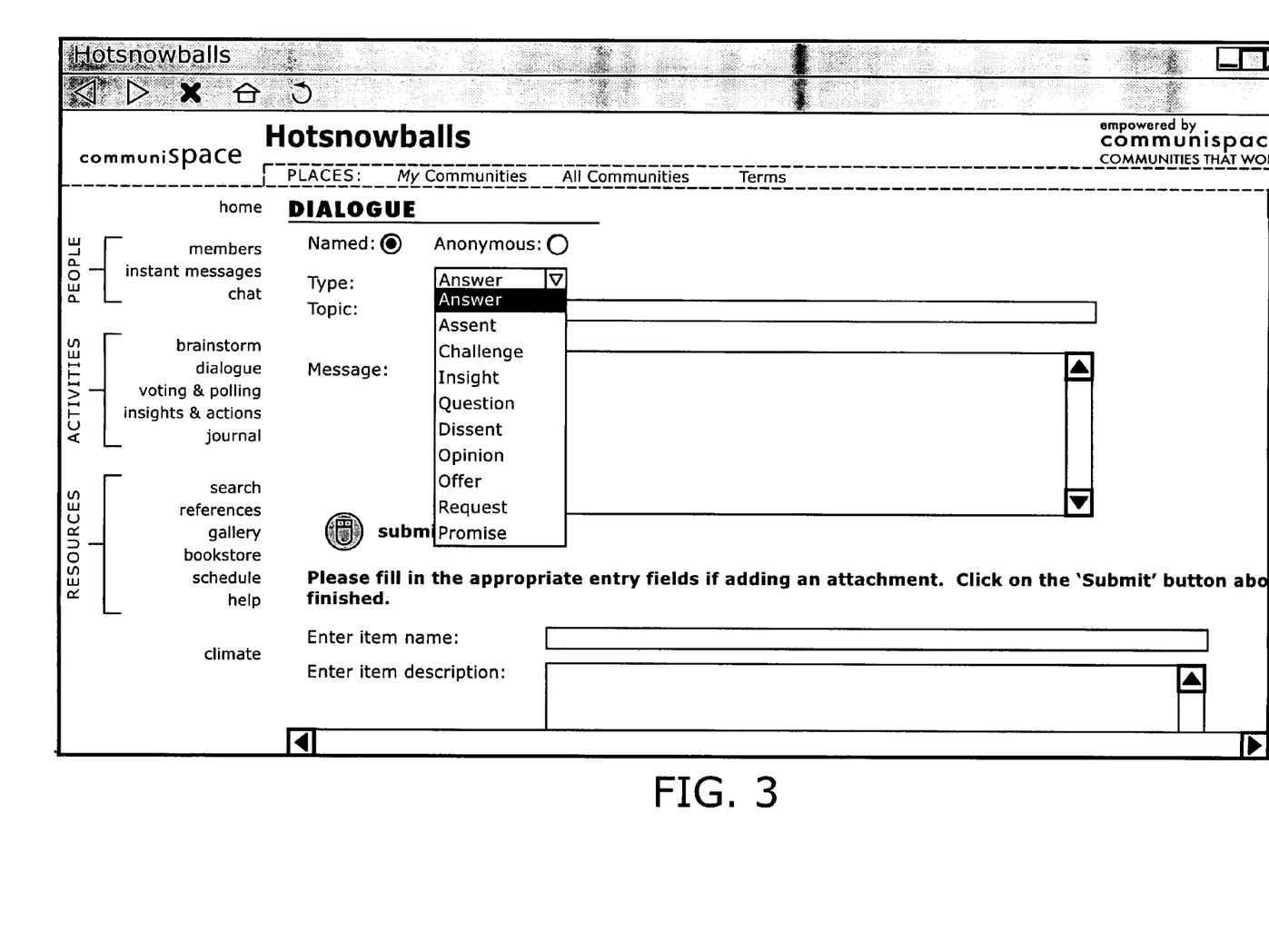
FIG. 3 is a web page for contributing to a dialogue within the virtual community.

A dialogue provides an opportunity in the virtual space for community members to discuss ideas. However, a dialogue is more structured and enables the participants to follow specific threads in each conversation. A dialogue is also active for a specific time interval. The participants access the dialogues from the navigation bar and are referred to a dialogue menu including the titles of all the current dialogues, the name of the person who convened each dialogue, and the expiration date. For each member, an icon will appear next to any current dialogue that he or she has never viewed, indicating that the dialogue is new to the user. If the participant chooses to create a new dialogue, he or she is prompted for a topic, keywords, and an end date. Keywords are used to facilitate later searching and as a method of associating multiple related activities. If a participant selects a specific dialogue, he or she is referred to a new page that shows all of the prior contributions to the dialogue. Indents indicate which contributions are responsive to previous contributions and which are new topics or threads in the conversation. The participant has the choice of responding to an existing contribution and continuing a thread of conversation or adding a new contribution and beginning a new strain in the dialogue (FIGS. 2,3). For both café chats and dialogues, contributions may be made in fields through which content is provided to the ASP, which stores that content and incorporates it into the community site. Each contribution is "typed" (question, agreement, assent, etc.) (FIG. 3) and flagged with the author's name and contribution date to facilitate searching and climate tracking and reporting, and users may print contributions or entire dialogues for easier reading. The contribution "types" serve several critical purposes. First, they help the contributor frame their response, resulting in a more focused contribution and conversation. Second, the "type icon" appears next to each contribution, providing a mechanism for participants and facilitators to easily organize and locate specific information. In this context, the icon also helps interpret the contribution by substituting for facial expressions normally used in everyday conversation. Finally, the system supports these "types" in binary pairs (question/answer, agree/disagree). These pairs are tracked and graphically reported in the discourse climate measure.

The dialogue is a form of threaded discussion. However, the system may include a threaded discussion tool for use in other activities as well. The tool may allow the contributions to be categorized. The tool may also enable users to expand or contract a dialogue or thread to view the full text of the posting or just its title, and to sort contributions based on type, date, and contributor (in addition to the current default of topic).

Figure 4:
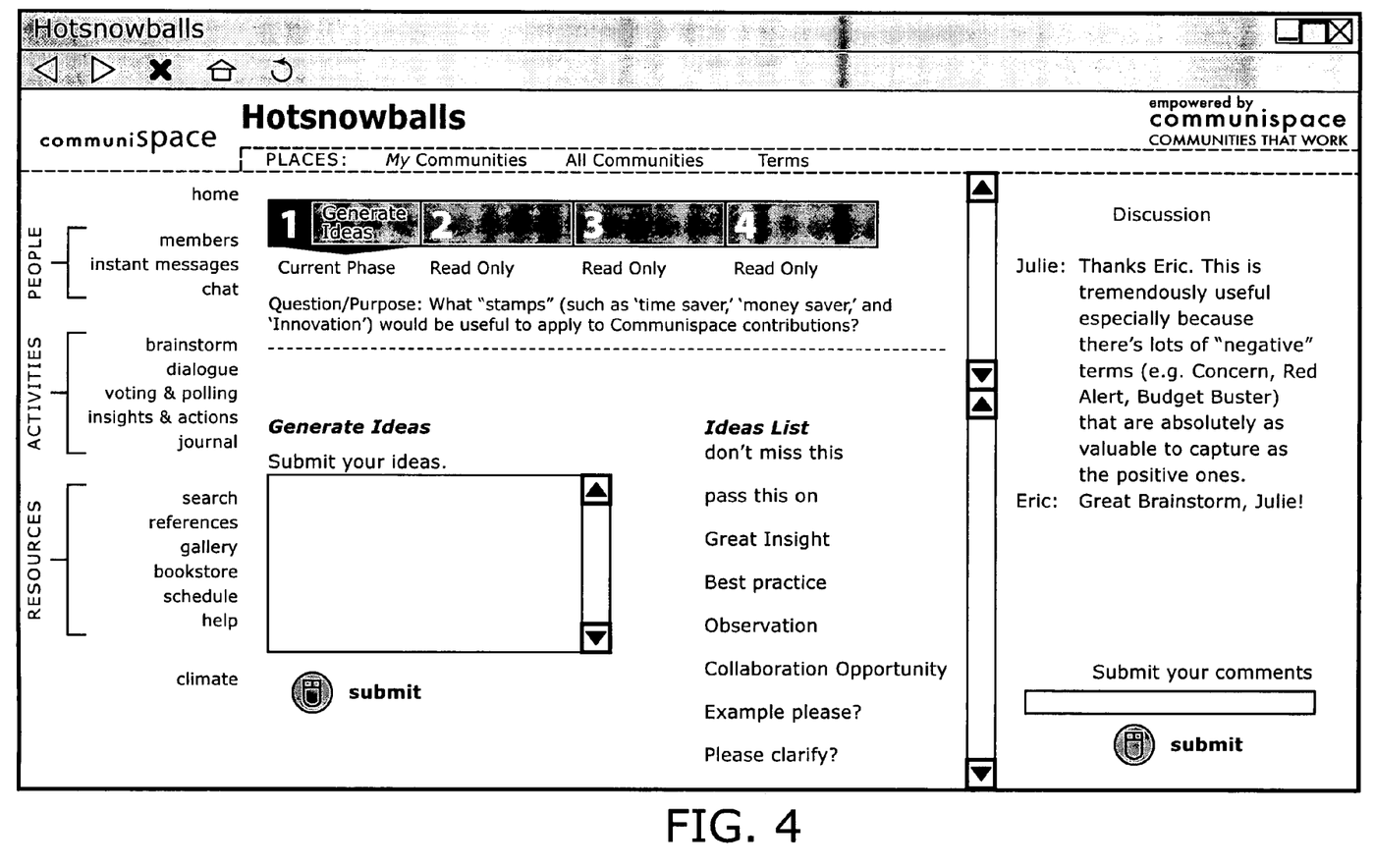
FIG. 4 is a web page for contributing to a brainstorming session within the virtual community.

The system can also be used to support brainstorm sessions. Participants are routed to a brainstorm menu from the navigational bar. The participants may review past brainstorm sessions, schedule brainstorm sessions, or participate in ongoing sessions. Because sessions are archived, participants creating new brainstorm sessions are requested to provide key words in addition to a brainstorm topic or question, and users may export content into a word processing program or a text file using RTF or ASCII. A session may be synchronous or asynchronous. That is, all of the participants may be asked to access the brainstorm at the same time, or individual participants may make contributions when it is convenient. In one embodiment, a brainstorm session is scheduled and has a start and an end date. The member creating the session specifies both a title and a question. Brainstorms may be simple, allowing users to simply submit and rate ideas, or "power brainstorms." A brainstorm comprises four phases: Generate Ideas, Organize Ideas, Establish Criteria, and Prioritize Ideas. The third phase is optional. The member creating the brainstorm session, called the convener, may give the other community members the ability to access all or some of the phases in any order. During the session, the convener determines which phase is the current phase and which phases are closed, or read-only. When a participant joins the brainstorm session, he or she is guided to a window containing a chat or dialogue frame and a brainstorm frame (FIG. 4). The chat frame is used if the brainstorm session is synchronous; a dialogue frame is used if the session is asynchronous. In the brainstorm frame, each participant may access all four phases of the session through buttons, links, or tabs in the brainstorm frame, although some phases may be read-only. Participants may input contributions into whichever phases are current through a field via which content is forwarded to the ASP.

During the Generate Ideas phase, participants anonymously submit ideas to a pool of ideas that are visible to all the contributors. The end of the phase may be scheduled, or all of the participants may elect to move on to the next phase by selecting the Organize Ideas button. The latter option is more frequently used during synchronous brainstorm sessions. During the Organize Ideas phase, the participants sort the ideas into categories that are generated by the participants themselves. However, each participant may individually select a category for an idea. That is, the placement of ideas in categories will be unique for each participant in the brainstorm session. By default, there is always a standalone category for unassigned ideas. Once the second phase is complete, the users proceed to the third phase, Establish Criteria. The participants simply type in their ideas for prioritization criteria and submit them to the ASP, which lists them for the remaining participants. The criteria list is visible to all participants in the session. However, this is an optional phase and can be skipped if the convener chooses.

In the fourth phase of the brainstorm session, the participants prioritize the ideas. If criteria exist, the priorities are made based on the established criteria. In one embodiment, each participant is requested to rank the top six ideas, with one as the highest and six as the lowest. Once the user submits the ranking to the ASP, he or she is able to see the results, including how many participants have also submitted a ranking. However, each participant may only submit a ranking once. When the users enter the Prioritize Ideas phase, the brainstorm frame includes a number of categorized ideas, each of which has a drop-down menu for the participants to input their rankings. In one embodiment, the ASP uses the categories selected by the participants during phase two and generates the idea list using a specified set of rules. In one embodiment, a group or category should only appear on the prioritized ideas page if the majority of participants has assigned at least one idea to the category, and an idea should only appear in a group if a significant number (e.g., 30%, 50%) of the participants have put it there. If too few participants have placed a given idea in a single category, then it should remain a standalone idea. As a result, a given idea may appear in multiple groups; however, a given user may assign it as a priority only once. After the participants submit their rankings, the aggregated results from all the submissions so far are displayed. If the participant has entered duplicate rankings or ranked more than six items, an error message is displayed. On the other hand, users are permitted to rank fewer than six items.

Chats, dialogues, and other activities enable the users to generate content for the system. When submitting content to a dialogue, chat, announcement, etc., the user may also attach existing content either directly or via a link. For example, a link to a member profile or dialogue may be attached to an announcement of a new dialogue. In addition to determining categories or keywords for the content, users may also rate the content according to some criterion.

Chats and dialogues are not the only means of communication within the community. Users may also send instant messages to one another. A buddy list will show a user which other participants from the communities and teams he/she is a part of are on line, as well as which communities they participate in. Instant messages may be sent to individual or multiple users. The system may also enable a user to send email, and it may interact with a user's personal address book so that the user does not have to remember a recipient's email address to send email while logged in.

As noted above, the community site provides resources to the individual participants in the community. These resources include tools to help the participants contribute to the community. They also include research resources such as the links and documents provided with the community site during customization. In one embodiment, one or more communities may create and maintain a reference center where users can place content for use by other participants. Content in the reference center may be sorted and searched in the same manner as other content generated by participants. Users will assign categories, keywords, etc. to content that is placed in the reference center. Users who access the content may also be asked to provide a rating and/or comments on posted content to help indicate the relative suitability of the document for future searches. In one embodiment, selected members of the community (conveners, facilitators, team leaders, administrators, etc.) may purge reference content or restore it from an offline storage medium.

In addition, there are other resources through which participants can actively enhance their ability to contribute to the community. For example, a reflection page is accessible from the navigation bar. The reflection page prompts users to keep a journal, meditate, or perform other activities that enable the user to step back from the task at hand and organize his or her thoughts and emotions. As for the other activities and tools in the community site, the reflection page also provides resources to help the users do these activities, such as links to resources on journal writing, guided meditation, or meditation techniques.

The community site also provides an opportunity for the users to report their conclusions and thoughts to the rest of the community. When a user selects "Insights and Actions" from the navigation panel, he or she is provided a choice to create a new entry or to search or view previous entries from other users. In one embodiment, the entry includes a title or topic, keywords for archiving, the name of the contributor, a description of the event, what was learned, and what will be done differently next time.

The community site may also include a gallery of multimedia exhibits assembled by the participants. Each exhibit comprises one or more canvasses that may contain an image, text, and/or an audio file. Users viewing the exhibits may also comment on each canvas. A user may also present an exhibit simultaneously to a number of other users. In one embodiment, either the presenter, the audience, or both comment on the various pages either with text or audio chat. Users may also prepare a series of slides that include both exhibit material and comments. When creating an exhibit, the convener is prompted for a title and a brief description and an opening date. A member may add his or her name to the exhibit or place it on the site anonymously, and the convener may choose whether to allow other users to add to the exhibit. The convener is also prompted for information on the presentation of each canvas, for example, background colors. After previewing the canvass, the convener may edit the canvas, create a new one, or indicate that the exhibit is complete.

Any participant in the community may use a polling or voting tool to ask others' opinions. The convener writes the question and the answer options and decides whether the respondent should rank the options (poll) or choose one or more preferred options from a list (vote). The tool also provides rating (e.g., a scale) and open-ended questions. In one embodiment, the tool supports both aggregated anonymous responses and the ability to associate individual responses to each responding member. The convener also assigns a keyword or category to the poll or vote to facilitate searching. A poll may be synchronous or asynchronous. When a vote or an asynchronous poll is initiated, all community members should be notified via email or a personal home page message. The convener determines the life cycle of the poll or vote, which is automatically archived when it expires. Users may access the polling and voting page to create, respond to, or view poll results from the navigation bar or the tool bar. Once a community member responds to a poll, he or she may view the results of that poll. Polls may be instantaneous, with the system displaying results as users vote.

The community site also includes a calendar displaying planned activities for the community. The current week's events also appear on the home page as announcements. Any participant may schedule an event for the community, such as a brainstorm, or a dialogue. Non-community events may be posted as well. The event may be added to the calendar from the calendar page or from the event page. For example, a brainstorm session may be scheduled from the calendar page or from the brainstorm page. When a community member schedules an event from the calendar page, he or she is prompted to choose an event type, schedule the start and end date and times, and determine whether to notify some or all of the group members by e-mail that an event is scheduled. However, all events are open to everyone in the community. A convener who schedules a particular event may be assigned a role for that event as discussed above and may edit the date, time, description and notification options for the event at a later time. When a user accesses the calendar, he/she is shown all public activities and those activities to which he/she has been invited. The listing on the calendar may be linked to a more detailed description of the event or activity.

Users may post announcements about scheduled events or other matters to the community, team, or enterprise homepage. Alternatively, the announcement may be posted to a subset of users. The announcement may include a graphic such as an animated .gif file or an audio file. The audio file may be recorded by speaking into the computer's microphone or by calling a phone number and recording the content. Users may also invite other users to participate in an activity or project via a link in an activity scheduling web page. The link refers the user to a page with prompts for a list of invitees and a description of the event. The invitees may accept or decline by clicking a button in the invitation, and the system monitors the responses and lists them in the calendar.

Activities may be combined to form processes. A seminar is one type of asynchronous process in which a leader typically posts readings (or any other form of content link) on a regular basis, conducts dialogues relevant to those readings, assigns projects to individuals or teams (which may be completed using the co-create tool) and potentially administers quizzes. A customer community may convene a focus group process where a facilitator asks a series of questions or presents a number of slides or web pages to guests for discussion. An after-action review process steps users through a series of questions about objectives and achievements and then allows them to develop an action plan based on the review. Teams and communities may use an event planning process, including brainstorming, assigning action items, and co-creating agendas, to plan face-to-face meetings. Virtual meeting processes will step users though developing an agenda, using chat or a threaded dialogue to conduct a discussion, making decisions, and formulating an action plan. In one embodiment, users post content to the discussion using a whiteboard tool. Communities of sales people may co-create proposals and presentations. The proposal process will step the community through assigning different sections of the work to users, co-creating and critiquing one another's work, and storing "boilerplate" versions of the product in a database, folder, or reference center. A competitive analysis process will prompt users to identify and research potential competitors, answer a series of questions about each, and store the answers in a database. A negotiation process will step users through the process of articulating their needs, their priorities, their areas of flexibility, etc., and equips the negotiators with tips on effective negotiation. The negotiation process may also be employed to facilitate exchanges of products, people, and services within the community or enterprise.

In a face-to-face community, individuals who have been part of the community for a long time provide institutional memory to newer members of the community. In a virtual community, the institutional memory can be preserved without the risk of losing important knowledge as members leave the community, for example, by moving away. First of all, a member who moves may still be part of the community if he or she has access to a computer. More importantly, the institutional memory of the community is stored at the ASP. As activities are archived, they are not lost. Users searching for content may choose to search both current and archived content. New discussion threads in current dialogues and chats may be linked to similar threads in archived content.

Such links may be established by members of the community or may be set up automatically by the system. For example, current content may be linked to archived content having similar key words. Alternatively, a member's contributions may be tracked across archived and current content. Archived brainstorms from the beginning of a project may be linked to current dialogues as the project matures and develops, enabling community members to track the progress of the project over time.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system for bringing together a community having a plurality of members, comprising:
    a client server system, comprising:
        data input means for receiving member contributions, wherein the data input means require members to assign a predefined type to predetermined contributions, the type being one of at least one predetermined binary pair of types;
        data storage means for storing member contributions, wherein the data storage means record the number of each assigned type; and
        output means for displaying member contributions to the community, wherein the predetermined contributions are displayed with a predetermined icon that indicates the assigned type,
    wherein the client server system provides a virtual location for members to develop a virtual online community,
    wherein the members are invited to participate in the community, and
    wherein the community is brought together to achieve a predetermined goal.

2. The system of claim 1, wherein the community is disbanded after a predetermined time interval or upon completion of the goal.

3. The system of claim 1, wherein the client server system provides a virtual location for members to meet to perform a task during a preset time interval.

4. The system of claim 1, wherein the client server system provides a virtual location for at least a portion of the members to brainstorm, and wherein a brainstorm session may be conducted asynchronously.

5. The system of claim 1, wherein the member contributions comprise multi-media exhibits comprising at least one member of text, sound, and graphics.

6. The system of claim 1, wherein the member contributions comprise comments on preexisting member contributions.

7. The system of claim 1, wherein the member contributions comprise conversation elements, and wherein the output means are adapted and configured to output the conversation elements in real time.

8. The system of claim 7, wherein the client server system is adapted and constructed to receive conversation elements from a plurality of members who are all accessing the system at the same time.

9. The system of claim 8, wherein the client server system is adapted and constructed to display at least one member of a link to a member profile, a picture of the member, and a name of the member for every member who is currently accessing the system.

10. The system of claim 7, wherein the client server system is adapted and constructed to receive conversation elements from a plurality of members who are not all accessing the system at the same time.

11. The system of claim 7, wherein the data input means are configured to assign each conversation element to a conversation thread, and wherein the output means is adapted and constructed to provide a distinction among a plurality of conversation threads.

12. The system of claim 11, wherein the output means is adapted and constructed to display a member of at least one one of the plurality of conversation threads, a list of the conversation threads, and both of the above.

13. The system of claim 1, wherein the data input means are adapted and constructed to receive a member contribution comprising a link to data stored in the data storage means or outside of the data storage means.

14. The system of claim 1, wherein the client server system is adapted and constructed to facilitate an activity for a member, wherein said activity enhances the member's interaction with the community.

15. The system of claim 14, wherein the activity is selected from the group consisting of dialogue, poll, vote, chat, and brainstorm.

16. The system of claim 1, wherein the system is configured to prompt members to adopt a role within the community, wherein the role comprises a responsibility associated with the role and is adapted to promote a goal of the community.

17. The system of claim 16, wherein the role is selected from the group consisting of convener, facilitator, team leader, and participant.

18. The system of claim 17, wherein the role is selected from distiller, artist, pulse-taker, storyteller, jester, greeter, evocateur, and protector.

19. The system of claim 16, wherein the role comprises a behavior adapted by an individual in a face-to-face interaction.

20. The system of claim 1, wherein the client server system comprises a calendar of community activities.

21. The system of claim 1, wherein the client server system is configured to receive ideas and category preferences from members, and wherein the client server system is further configured to generate category information for the ideas based on the category preferences.

22. The system of claim 1, wherein the output means are adapted and constructed to link a member's contribution to a profile for the member.

23. The system of claim 1, wherein the output means are adapted and constructed to display a member's contribution with a picture of the member.

24. The system of claim 1, wherein the data input means are adapted and constructed to record whether a predetermined member has read a predetermined member contribution, and wherein the output means are adapted and constructed to indicate to the predetermined member whether the predetermined member has viewed the predetermined member contribution.

25. The system of claim 1, wherein the data input means are adapted and constructed to provide at least one category assignment for each member contribution.

26. The system of claim 25, wherein the category is selected from the group consisting of creation date, activity type and the member making the contribution.

27. The system of claim 26, wherein the category comprises a relationship of the contribution to another contribution.

28. The system of claim 27, wherein the relationship is selected from the group consisting of question, answer, agreement, disagreement, request, commitment, decision, and action item and wherein the output means is adapted and constructed to display the relationship with the member contribution.

29. The system of claim 1, wherein the client server system is adapted and constructed to provide at least one category assignment for existing member contributions.

30. The system of claim 29, wherein the category is selected from the group consisting of a member who has viewed the contribution, a number of members who have viewed the contribution, a number of times the contribution has been viewed, and a date the contribution was archived.

31. The system of claim 29, wherein the data input means are adapted and constructed to receive and aggregate rating data from members regarding a predetermined member contribution, and wherein the category assignment is the aggregated rating data.

32. A method of conducting an online brainstorm session, comprising:
provinding a system according to claim 1;
receiving scheduling information for phases of the brainstorm session;
receiving ideas from participants in the brainstorm session;
receiving category preferences for each idea from at least a portion of the participants;
generating category information for each idea based on the category preferences; and
receiving priority information for each idea from the participants.

33. The method of claim 32, wherein the brainstorm session is conducted synchronously or asynchronously.

34. The method of claim 32, further comprising receiving prioritization criteria for the ideas.

35. A method for incorporating institutional memory into an online activity, comprising:
providing a system according to claim 1;
receiving contributions from participants in the activity;
comparing a first characteristic of each contribution to contributions in an archived activity; and
establishing a first cross-activity thread comprising contributions having a shared first characteristic.

36. The method of claim 35, wherein the characteristic is selected from a conversation thread, an activity participant who made the contribution, and a keyword.

37. The method of claim 35, further comprising comparing a second characteristic of each contribution to contributions in the archived activity, and establishing a second cross-activity thread.

* * * * *